United States Patent [19]

Ishibashi

[11] Patent Number: 5,202,281
[45] Date of Patent: Apr. 13, 1993

[54] METHOD OF MANUFACTURING SILICON SEMICONDUCTOR ACCELERATION SENSOR DEVICES

[75] Inventor: Kiyoshi Ishibashi, Itami, Japan

[73] Assignee: Mitsubishi Denki Kabushiki Kaisha, Tokyo, Japan

[21] Appl. No.: 763,224

[22] Filed: Sep. 20, 1991

[30] Foreign Application Priority Data

Feb. 12, 1991 [JP] Japan .................. 3-38906

[51] Int. Cl.⁵ ............................................ H01L 21/72
[52] U.S. Cl. ........................................ 437/51; 437/228; 437/927
[58] Field of Search ............... 437/51, 225, 228, 927, 437/974; 148/DIG. 135; 73/517 R, 517 AV

[56] References Cited

U.S. PATENT DOCUMENTS

| | | | |
|---|---|---|---|
| 4,670,092 | 6/1987 | Motamedi | 437/249 |
| 4,706,374 | 11/1987 | Murakami | 437/225 |
| 4,783,237 | 11/1988 | Aine et al. | 437/225 |
| 4,836,025 | 6/1989 | Mihara | 73/517 R |
| 5,060,039 | 10/1991 | Weinberg et al. | 73/517 R |

*Primary Examiner*—Brian E. Hearn
*Assistant Examiner*—C. Chaudhari
*Attorney, Agent, or Firm*—Leydig, Voit & Maeyr

[57] ABSTRACT

A method of manufacturing a semiconductor acceleration includes oxidizing a silicon wafer, removing the oxide film and underlying silicon in a U-shaped pattern at a front surface of the wafer by etching to form a portion that is to become a cantilever, depositing a thin metal film covering the U-shaped pattern that is to become the cantilever, etching a recessed portion in the rear surface of the silicon wafer encompassing the U-shaped pattern, thereby forming the cantilever, dicing the silicon wafer into chips, and removing at least part of the thin metal film, thereby releasing the cantilever.

2 Claims, 2 Drawing Sheets

METHOD OF MANUFACTURING SILICON SEMICONDUCTOR ACCELERATION SENSOR DEVICES

BACKGROUND OF THE INVENTION

1. Field of the Invention

The present invention relates to a method of manufacturing silicon semiconductor acceleration sensor devices and, more particularly, to a method of manufacturing built-in cantilever type silicon semiconductor acceleration sensor devices.

2. Description of the Related Art

Semiconductor acceleration sensors are designed to apply accelerative forces to, for example, a silicon thin plate by some means and to detect the deflection of the silicon thin plate caused by the application of the accelerative forces thereto in the form of changes in resistance of a gage resistor formed in a silicon thin plate. Conventional semiconductor acceleration sensors of the above-described type include a cantilever type semiconductor acceleration sensor such as that shown in FIGS. 4 and 5.

In this semiconductor acceleration sensor, accelerative forces are generated by the mass of an overall cantilever 1. Consequently, the vicinity of a supporting portion 2 of the cantilever 1 is subjected to a torque, causing the resistance of a gage resistor 3 embedded in the supporting portion 2 to change. These changes in the resistance are detected as a current or voltage change signal.

The conventional silicon semiconductor acceleration sensor arranged in the above-described manner is manufactured by the following procedures.

First, a silicon single crystal wafer 4 having a (100) orientation is oxidized to form an oxide film. Next, the oxide film formed around a portion which is turned into the cantilever 1 is removed in a U-shaped form using a photolithographic technique to form a U-shaped portion 5.

Thereafter, etching of the silicon is conducted using the oxide film 6 as an etching mask. The depth of an etched groove 7 generally ranges from 10 $\mu$m to 80 $\mu$m. After oxidation is conducted again, a P+ diffusion layer 8 is formed in the vicinity of the supporting portion 2 on which etching has not been conducted for the provision of an aluminum contact. Subsequently, four gage resistors 3 are formed in a bridge by the ion implantation.

Finally, aluminum wires 10 are led from a contact portion 9 of the gage resistors 3 for preparing the wiring for a power source and an output. At the same time, a bonding pad 11 is formed on the periphery of the acceleration sensor chip for wire bonding. Thereafter, a passivating nitride or oxide film 12 is applied to protect the aluminum wiring, and then the portion which is to be the cantilever 1 is thinned from the rear surface of the acceleration sensor chip by alkali anisotropic etching. As shown in FIG. 6, an etched surface 13 gradually proceeds and finally reaches the etched groove 7 formed in the U-shaped portion 5. At this time, etching is suspended whereby the cantilever 1 is formed. The built-in cantilever type acceleration sensor wafer formed in the manner described above is diced into individual chips in such a manner that the cantilevers 1 do not break to produce semiconductor acceleration sensor chips.

In the above-described silicon semiconductor acceleration sensor manufacturing method, a wafer 4 on which the cantilevers 1 have been formed must be handled very carefully. Or, the cantilevers 1 may be damaged and do not function. The cantilevers 1 which remain unbroken until after dicing may be broken in the subsequent assembly process. The rate of the cantilevers 1 which remain unbroken until after characterizing tests are finished is very low. The built-in cantilever type acceleration sensor is therefore very expensive although it is small in size.

SUMMARY OF THE INVENTION

Accordingly, an object of the present invention is to provide a method of manufacturing silicon semiconductor acceleration sensor devices which assures easy assembly of built-in cantilever type acceleration sensor chips. The built-in cantilever type acceleration sensor chips formed in a silicon wafer have a structure in which the cantilever portions are reinforced. The wafer processing process is completed in a state in which the cantilever portions are half finished. The cantilever portions are still reinforced so as to prevent them from being damaged during the subsequent dicing and assembly processes. At the last assembly process, the reinforcing material is mechanically broken or melted using a laser beam so as to make the cantilever movable.

In order to achieve the above object, according to one aspect of the present invention, there is provided a method of manufacturing silicon semiconductor acceleration sensor devices, which comprises the steps of: thermally oxidizing the overall surface of a silicon wafer; removing the thermal oxide film and the silicon disposed below the thermal oxide film in a U-shaped form by etching to form portions which are to become a cantilever; forming gage resistors on a supporting portion of each of the portions which are to become a cantilever; providing a thin metal film around the portions which is to become a cantilever; forming a recessed portion on the rear surface of the silicon wafer by etching the silicon to form the cantilever; dicing the silicon wafer into separate chips; and removing the metal thin film formed on the chip for holding the cantilever to make the cantilever movable.

According to another aspect of the present invention, there is provided a method of manufacturing silicon semiconductor acceleration sensor devices, which comprises the steps of: thermally oxidizing the overall surface of a silicon wafer; forming gage resistors on the wafer on a supporting portion for supporting a portion which is to become a cantilever; forming a recessed portion on the rear surface of the silicon wafer by etching the silicon; dicing the silicon wafer into separate chips; and removing the silicon of each chip in a U-shaped form to form the cantilever and thereby make the cantilever movable.

DESCRIPTION OF THE PREFERRED EMBODIMENTS

Figure 1:
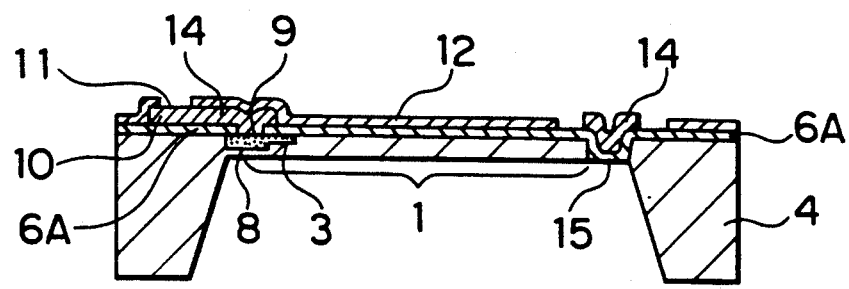
FIG. 1 is a side elevational cross-sectional view of an embodiment of a silicon semiconductor acceleration sensor device according to the present invention showing a cantilever being held.
Figure 2:
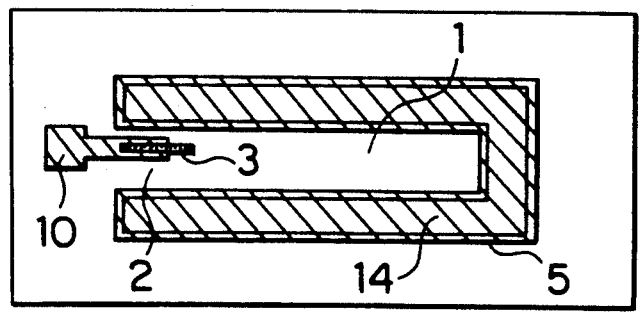
FIG. 2 is a plan view of the silicon semiconductor acceleration sensor device shown in FIG. 1.
Figure 3:
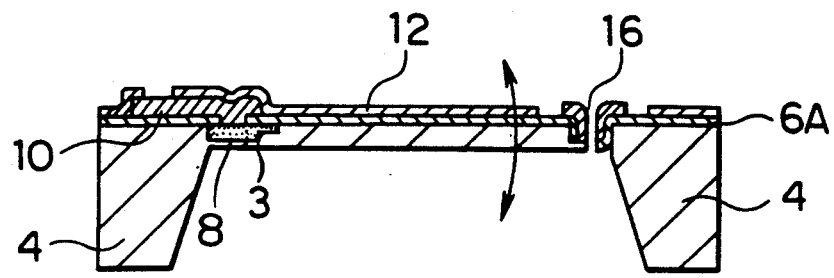
FIG. 3 is a side elevational cross-sectional view of the silicon semiconductor acceleration sensor device showing the cantilever released.
Figure 4:
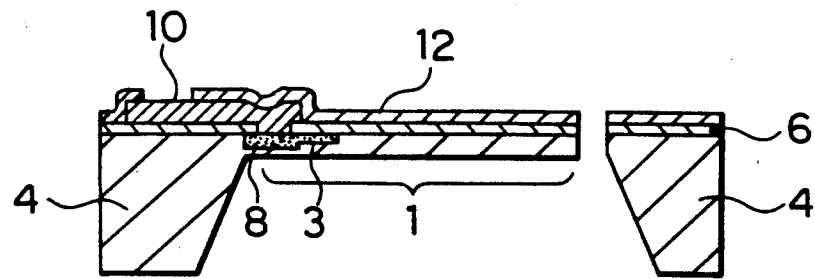
FIG. 4 is a side elevational cross-sectional view of a conventional silicon semiconductor acceleration sensor device.
Figure 5:
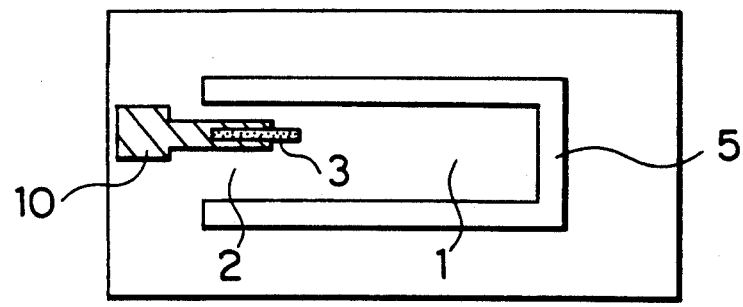
FIG. 5 is a plan view of the silicon semiconductor acceleration sensor device shown in FIG. 4.
Figure 6:
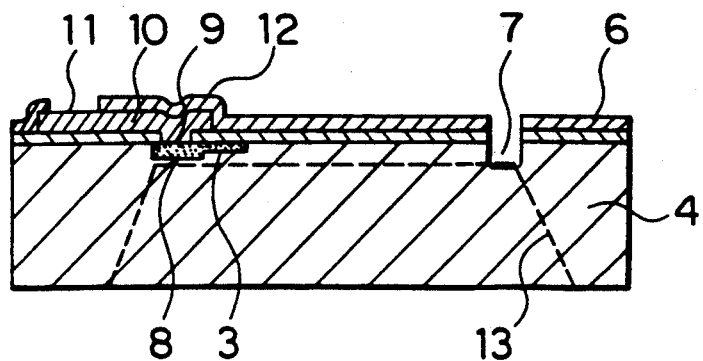
FIG. 6 is a side elevational cross-sectional view of the conventional silicon semiconductor acceleration sensor device in which anisotropic etching has not been conducted.

Embodiments of the present invention will now be described with reference to FIGS. 1 to 3 in which the same reference numerals are used to denote the corresponding parts.

First Embodiment

First, a silicon single crystal wafer 4, having a (100) crystalline orientation and a specific resistance of several ohm-centimeters, is prepared, and the overall surface of the wafer 4 is thermally oxidized to a depth of about 1 µm to form a thermal oxide film 6A. Next, the oxide film formed around the portion which is to become the cantilever 1 is removed by etching, using photolithographic techniques, in a U-shaped form to form the U-shaped portion 5 having a width of 250 µm to 300 µm. Thereafter, the silicon exposed in a U-shaped form is removed using the remaining oxide film as an etching mask and using a mixture of hydrofluoric acid, nitric acid and acetic acid. The etching depth is from 50 to 60 µm.

Next, the oxide film is removed entirely, and oxidation is conducted again to a thickness of 7000 Å. Subsequently, high-concentration boron ions are implanted and diffused into the contact portion 9 of the diffusion gage resistors 3, which are located in the supporting portion 2 for supporting the portion which is to become the cantilever 1, using known photolithographic and diffusion techniques, to form the P+ diffusion layer 8. Thereafter, the four diffusion gage resistors 3 are connected in a bridge circuit by photolithography and by the implantation of boron ions. Next, the oxide film 6A formed on the contact portion 9 of the diffusion gage resistors 3 is opened to form a window, and a thin metal film, e.g., an aluminum film 14, is formed for wiring by sputtering to a thickness of 5 to 10 µm. At that time, the aluminum film 14 on the U-shaped portion 5 is left in a width which is slightly larger than that of the U-shaped portion 5. Next, the nitride or oxide film 12 is deposited by CVD for protection of the aluminum wiring 10.

Finally, the rear surface of the wafer 4 is polished by lapping to a predetermined thickness of about 300 µm, and the nitride or oxide film 12 is deposited thereon. After the nitride or oxide film 12 on the portion which is to become the cantilever 1 is removed to open a window, the rear surface of the wafer 4 is etched using an alkali anisotropic etchant, such as KOH. At that time, the opposite surface of the wafer on which the diffusion gage resistors 3 and the aluminum wiring 10 have been formed is covered with a surface protective member such as wax so that it is not damaged during the alkali anisotropic etching.

When the alkali anisotropic etching proceeds and reaches the bottom of the U-shaped portion 5, it is suspended. At that time, the oxide film 12 on the bottom 15 of the U-shaped portion 5 and the aluminum film 14 are partially removed by the alkali etchant. However, the aluminum film 14 is sufficiently thick and no problems result. Thereafter, the wafer 4 is thoroughly washed using pure water or an organic solvent to obtain the built-in cantilever type acceleration sensor on which the cantilever 1 is reinforced by the acceleration sensor chip body and the aluminum film 14.

In this state, the cantilever 1 manufactured by alkali anisotropic etching is held to the acceleration sensor chip body by the aluminum thin film 14, and thus the chip is a semi-finished product which does not operate as an acceleration sensor. Next, the acceleration sensor wafer is diced into separate chips.

In the conventional method of manufacturing the semiconductor acceleration sensor wafer, since the cantilever is in a movable state, it may be damaged by the hydraulic pressure of the cutting water during dicing. However, in the manufacturing method according to the present invention, the cantilever 1 is held to the acceleration sensor chip body and is reinforced by the aluminum film 14. Therefore, dicing can be conducted as easily as it is done in normal silicon semiconductor wafer processing without problems.

Subsequently, separate acceleration sensor chips are each die mounted on headers or leadframes using a silicone rubber or solder. At that time, a base made of pyrex or silicon may be laid under the chip in order to ease the stress generated by the die bonding. After the die bonding, wire bonding is carried out with gold wires. Next, the aluminum film 14 formed on the U-shaped portion 5 for holding the cantilever 1 to the acceleration sensor chip body is broken by mechanically deflecting the cantilever 1 (to form a broken portion 16) so as to make the cantilever 1 movable, as shown in FIG. 3. The cantilever 1 may also be made movable by applying a laser beam on the aluminum film 14 to melt the thin film 14.

After the cantilever 1 is made movable, a lid is placed over the chip in order to protect it, thereby completing an acceleration sensor device. In a case where a metal package, such as a header, is used, a damping oil, together with the chip, may be included in the metal package for the purpose of suppressing vibrations of the cantilever 1.

During the above-described assembly process, various types of impacts are exerted on the cantilever 1, damaging the cantilever 1. However, in the acceleration sensor to which the present invention is applied, since the cantilever 1 is held to the chip body by the aluminum film 14, the cantilever is not damaged by various impacts exerted thereon during the assembly process and the assembly work is thereby facilitated.

Second Embodiment

After the silicon single crystal wafer 4, having a (100) orientation and a specific resistance of several ohm-centimeters, is thermally oxidized in a manner similar to that of the first embodiment, the diffusion gage resistors 3 are formed on the supporting portion 2 for supporting the portion which is to become the cantilever 1 using known bipolar IC manufacturing techniques. In the case of the second embodiment, etching of the U-shaped portion is not conducted at this time. Next, the input/output wiring is completed by extending the aluminum wire 10 from the gage resistors 3, and the bonding pad 11 made of aluminum is provided on the periphery of the chip. At the final stage of the process for the wafer front surface, the nitride or oxide film 12 is deposited by CVD for the protection of the aluminum wiring 10.

Thereafter, the rear surface of the wafer 4 is lapped to a thickness of, for example, about 300 μm, and, then polished, and the nitride or oxide film 12 is deposited thereon. After the nitride or oxide film 12 formed on the portion which is turned to be the cantilever 1 is removed to open a window, silicon etching is conducted using the alkali anisotropic etchant, such as KOH, until the predetermined thickness of the cantilever 1 is attained. The built-in cantilever type acceleration sensor wafer is thus obtained, in which the cantilever 1 is held and retained by the acceleration sensor chip body and the silicon semiconductor.

In this state, the chip is a semi-finished product which does not operate as an acceleration sensor, as in the case of the first embodiment. Thereafter, the wafer is diced into separate chips which are fabricated into individual acceleration sensor devices through the following assembly processes.

At that time, since the cantilever 1 is fixedly held by the acceleration sensor chip body and the silicon semiconductor, it is not broken by the mechanical impacts exerted thereon during the assembly process. At the final stage of the assembly process, the acceleration sensor chip body and the cantilever 1 are separated from each other by applying a laser beam in a U-shaped path and thereby cutting out the U-shaped portion. In this way, the cantilever 1 is released and made movable. Finally, the lid is placed over the chip for the protection of the chip, as in the case of the first embodiment, thereby completing the acceleration sensor device.

As will be understood from the foregoing description, it is possible according to the acceleration sensor device manufacturing method of the present invention to prevent the cantilever from being damaged during the assembly process due to various mechanical impacts exerted thereon. Therefore, handling of the chips during the assembly work is facilitated, and the yield is improved greatly. Production of small and inexpensive semiconductor acceleration sensor devices is thus possible. In the case where the cantilever is fixed by the silicon of the wafer, the number of mandays required is reduced.

What is claimed is:

1. A method of manufacturing a semiconductor acceleration sensor comprising:
   oxidizing a silicon wafer to form an oxide film;
   removing the oxide film and underlying silicon in a U-shaped pattern at a front surface of the wafer by etching to form a portion that is to become a cantilever;
   depositing a thin metal film covering the U-shaped pattern that is to become the cantilever;
   etching a recessed portion in the rear surface of the silicon wafer encompassing the U-shaped pattern, thereby forming the cantilever;
   dicing the silicon wafer into chips; and
   removing at least part of the thin metal film by mechanically deflecting the cantilever, thereby releasing the cantilever.

2. A method of manufacturing a semiconductor acceleration sensor according to claim 1 wherein the thin metal film comprises an aluminum film.

* * * * *